Feb. 25, 1941.     F. A. STEVENS     2,233,063

OPHTHALMIC MOUNTING

Filed Aug. 5, 1939

Inventor:
Frederick A. Stevens
By
Attorneys.

Patented Feb. 25, 1941

2,233,063

UNITED STATES PATENT OFFICE 2,233,063

OPHTHALMIC MOUNTING

Frederick A. Stevens, Providence, R. I., assignor of one-half to Martin-Copeland Company, Providence, R. I., a trusteeship Application August 5, 1939, Serial No. 288,595

1 Claim. (Cl. 88—42)

This invention relates to ophthalmic mountings and consists in improvements in the construction and arrangement of the bridge or nosepiece and the means for supporting the lenses of eyeglasses and spectacles therefrom and the nose-pads thereon.

One object of the invention is to provide an improved construction of bridge and drop-arm supports whereof the relationship of the lenses and the position of the nose-pads are capable of a wide range of adjustment without bending or distorting the shape of the bridge.

Another object of the invention is to provide for greater facility and convenience in adjusting the lenses at the proper pupilary distance and also the relationship of the nose-pads to fit the nose of the wearer.

Another object of the invention is to provide a construction in which a standard form of bridge or nose-piece may be employed for eyeglasses and spectacles having a wide range of different pupilary distance dimensions without alteration of the bridge.

Another object of the invention is to economize in the cost of manufacture of the mounting and also to reduce the number of different parts required to be carried by the manufacturer or dealer as stock.

Another object of the invention is to provide a mounting of improved ornamental appearance with its mechanical structure unobtrusive and inconspicuous.

Further objects of the improvement are set forth in the following specification which describes a preferred embodiment of the invention, with one modification thereof, as illustrated by the accompanying drawing. In the drawing.

Figure 1:
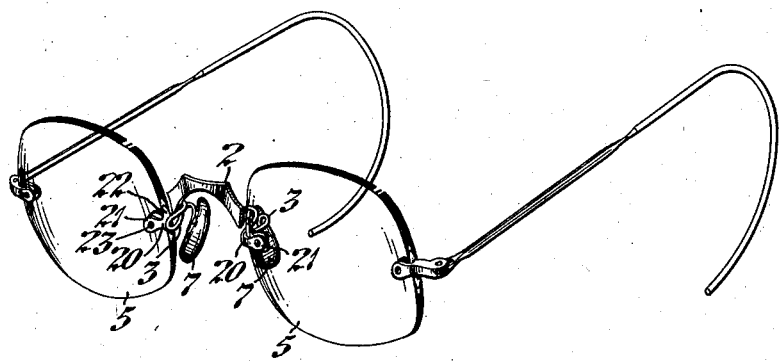
Fig. 1 is a perspective view of a pair of spectacles embodying the present improved bridge and mounting.

The present improved mounting is herein shown and described as applied to rimless spectacles, but it may be adapted for use with eyeglasses and spectacles of other types. The mounting consists essentially of a bridge or nosepiece 2 and separate supports or drop-arms 3 attached thereto and connected to the lenses 5 by straps or otherwise, with extensions of the arms for mounting the nose-pads 7 by which the glasses are supported from the nose of the wearer. As a particular feature of the improvement the bridge or nose-piece 2 is constructed as a separate element of the mounting so that it may be standardized for use with different types of lenses having a wide range in size and shape; it having been determined that only two sizes of bridge are required for glasses having a maximum range of adjustment as to their pupilary distance, commonly termed "p. d." Likewise, by constructing the supports or drop-arms 3 for the lenses and nose-pads as separate parts and joining them to the bridge the arms may be readily bent or formed independently of the bridge to adjust the relationship of the lenses in accordance with practically all p. d. requirements; and the nose-pads may be adjusted in position to effect a secure yet comfortable fit on the nose.

Figure 3:
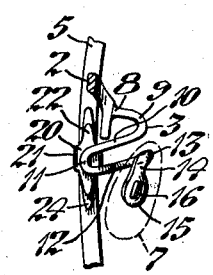
Fig. 3 is a side view of the same, part-sectional on the line 3—3 of Fig. 2.
Figure 4:
Fig. 4 is a perspective view in detail of one form of wire drop-arm for supporting the nose-pad.

Referring to the drawing, the bridge 2 may be constructed from flat stock as a stamping and conform to any desired shape or contour as usually provided for artistic effect. Preferably, the drop-arms 3 are formed of wire which may be of circular or rectangular shape in cross-section with the upper portion of the wire terminating in an end 8 of suitable shape for connection to the rearward face of the bridge 2 by soldering or other suitable means, see Fig. 3. As illustrated in this latter view, the wire arm 3 is bent around in a curved loop 9 to form a reversely-extending portion 10 and then bent back again in a loop 11 to provide an extension 12 substantially parallel to but offset laterally from the portion 10. The end of the extension 12 is bent back again in a loop 13 terminating in an offset portion 14 which is flattened to form an enlargement or ear 15 provided with a slot or opening 16 adapted to receive a projection or stud 17 for attaching the nose-pad 7 thereto.

As before noted, the bridge or nose-piece 2 may be shaped to any desired artistic configuration and ornamented by stamping or engraving designs thereon. The drop-arms 3 are soldered or otherwise secured to the rearward face of the bridge 2 as shown most clearly in Figs. 2 and 3. The loop 11 at the end of the forwardly-extending portion 10 of each arm 3 is attached to a suitable lens-support or connecting means 20. The present drawing illustrates a usual form of lens-strap 20 having opposite parallel ears 21 adapted to straddle the sides of the lens 5 and a shoe 22 shaped substantially to the edge thereof. A screw 23 inserted through an orifice in one of the ears 21 and a hole in the lens 5 has its end threaded into the opposite ear to bind the strap in place and fasten the lens fixedly to the mounting. Preferably a leaf-spring 24 of usual construction is positioned between the shoe 22 and the edge of the lens 5. Conveniently, the loop 11 of the drop-arm 3 is soldered to the back of the shoe 22 of the strap 20 with the extension 12 of the arm projecting rearwardly therefrom as shown most clearly in Fig. 3. The end portion 14 of the loop-extension 12 projects downwardly at an angle and, as before stated, is usually provided with an opening 16 for receiving the stud or rivet 17 for attaching the nose-pad 7 thereto, see Fig. 2. The nose-pads 7 may be of any usual form, generally consisting of an ovate backing plate loosely swiveled to the end of the arm 3 and mounting a convex shell constructed of a material such as sold under the trade-name "Celluloid" or "Zylonite."

Figure 6:
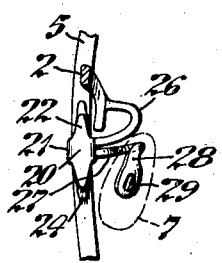
Fig. 6 is a view similar to Fig. 3 showing a modified form of construction of the mounting.

Fig. 6 of the drawing represents a slightly modified form of construction of the mounting in which the drop-arm is made in two sections 26 and 27, the upper section 26 consisting of a wire formed into a loop with one end soldered or otherwise secured to the back of the bridge 2 and the end of its forwardly-extending portion secured to the side of the strap 20. The shorter portion 27 of the drop-arm has its end soldered to the side of the strap 20 and projects rearwardly therefrom, being bent into a downwardly projecting portion 28 and provided with an opening 29 at its end for receiving the stud or rivet 17 on the nose-pad 7.

Figure 2:
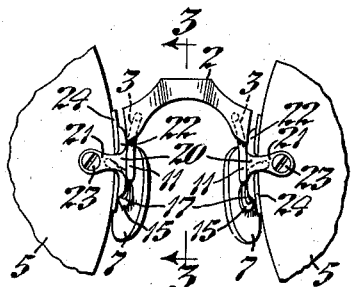
Fig. 2 is an enlarged front elevation of the mounting with a fragmentary view of the lenses which it connects.

In either form of construction as herein illustrated the major portion of the drop-arm is hidden behind the bridge 2 and the lens-straps 20 when the glasses are viewed from the front, see Fig. 2. That is to say, the mechanical structure of the device is inconspicuous and unobtrusive so as not to detract from the ornamental appearance of the bridge 2. For this reason the complete assembly has a more artistic and ornamental effect than mountings of usual type. Moreover, due to the relative flexibility of the drop-arms 3 the lenses 5 may be adjusted edgewise toward or away from each other without distorting the shape of the bridge 2. That is to say, the arms 3 may be readily and conveniently bent inwardly or outwardly with respect to the bridge 2 to adjust the pupilary distance of the lenses, the relative flexibility of the arms providing for this adjustment. Likewise, the nose-pads 7 may be adjusted in proper relationship and turned to the required position to contact lightly with the nose of the wearer when the glasses are fitted. These adjustments may be readily made by the oculist or optician with the use of an ordinary pair of pliers without requiring expert attention in the hands of a mechanic. Due to the fact that the drop-arms 3 are joined to the back of the bridge 2 and extended therefrom in loops they may be bent at relatively sharp angles to effect maximum changes in the pupilary distance of the lenses.

Figure 5:
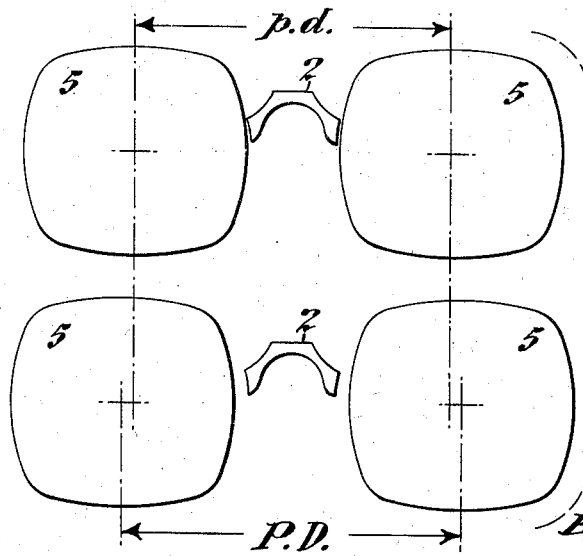
Fig. 5 is a more or less schematic view illustrating the range of adjustment of the pupilary distance of the lenses with respect to the bridge.

As indicated by the diagrammatic view in Fig. 5, the lenses may be set with their edges in close relation to the bridge 2, or at a relatively wide distance therefrom, without the bridge interfering with the lenses of whatever shape the latter may be. Consequently, a single ornamental bridge is adapted for use with lenses having a wide variation in size and shape, only two standard sizes of bridge being required for a large variety of glasses. Moreover, only one form of drop-arm is necessary for use with the standard bridge. For this reason the manufacturer is not required to construct dies for a large number of different sizes of nose-pieces and, likewise, the optician does not need to carry a large stock of the mountings for fitting persons having varied requirements; four different sizes being usually required.

As a still further advantage the separate construction of the drop-arm provides for maximum resiliency whereof to give a cushioning effect to prevent breakage of the lenses if the glasses are dropped or handled roughly. In addition to the advantages set forth above the present improved mounting can be manufactured more economically due to simplification and standardization of the parts, it being possible to produce the parts in large quantities by automatic machinery. Such parts can be stocked extensively and assembled in accordance with dimensional orders by simply soldering them in connection. At the same time, the complete assembly is highly ornamental and artistic in appearance without revealing any joints or other objectionable mechanical features. Thus, it will be observed that the present invention provides for an important improvement in the art.

While the invention is herein shown and described as embodied in a preferred form of construction and with one modification thereof it is to be understood that other changes may be made in the structure and arrangement of its parts without departing from the spirit or scope of the invention. Therefore, without limiting myself in this respect, I claim:

An ophthalmic mounting comprising an inverted U-shaped bridge having depending legs with an ornamental front face and a relatively flat rearward face, drop-arms constructed of wires having their ends attached in abutting relation to the flat rearward face of the bridge and extending rearwardly therefrom, said arms being looped to provide portions extending forwardly and then looped to extend rearwardly and downwardly, the forward loops being adapted to be secured at their sides to the lens-straps and the downwardly-extending portions shaped to support nose-pads, the upper loops of the drop-arm being positioned at the rear of the depending legs of the bridge and concealed thereby when viewed from the front.

FREDERICK A. STEVENS.